(No Model.)
C. HEATON.
SAFETY GUARD FOR EMERY WHEELS.
No. 249,934. Patented Nov. 22, 1881.
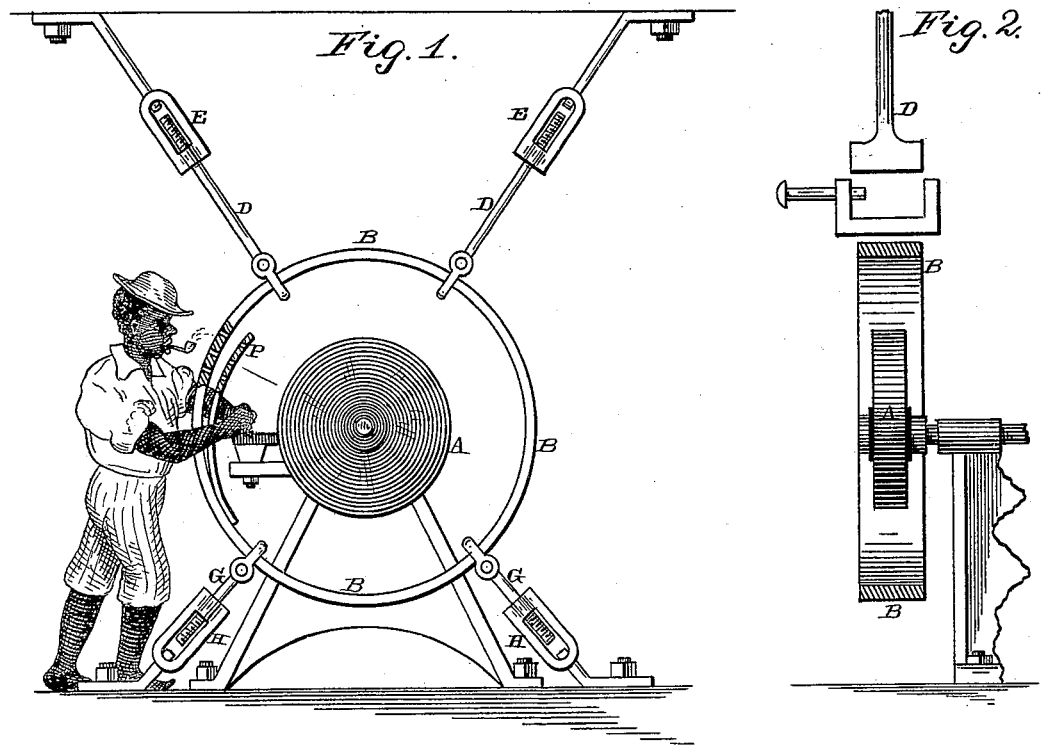
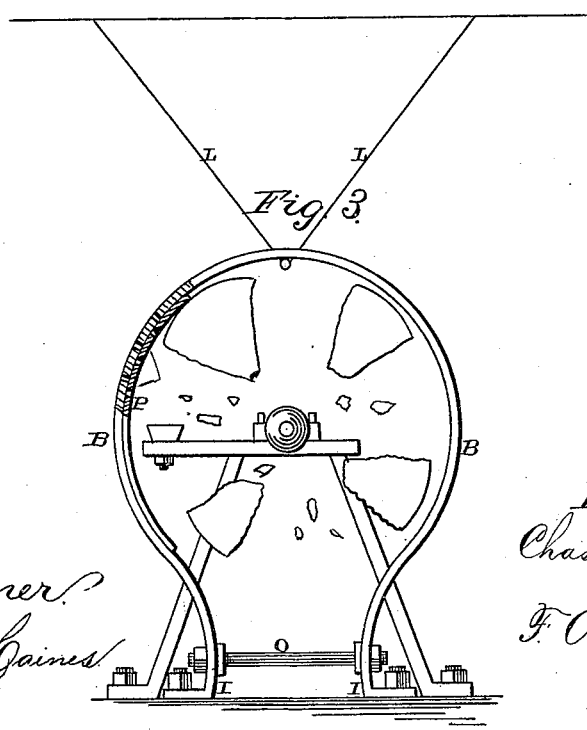
Witnesses:
J. W. Garner
W. S. D. Haines
Inventor:
Chas. Heaton
per
F. A. Lehmann,
Atty
N. PETERS. Photo-Lithographer. Washington. D. C.

UNITED STATES PATENT OFFICE.

CHARLES HEATON, OF ALBANY, NEW YORK.

SAFETY-GUARD FOR EMERY-WHEELS.

SPECIFICATION forming part of Letters Patent No. 249,934, dated November 22, 1881.

Application filed September 24, 1881. (No model.)

*To all whom it may concern:*

Be it known that I, CHARLES HEATON, of Albany, in the county of Albany and State of New York, have invented certain new and useful Improvements in Safety-Guards for Emery-Wheels and Grindstones; and I do hereby declare the following to be a full, clear, and exact description of the invention, such as will enable others skilled in the art to which it pertains to make and use it, reference being had to the accompanying drawings, which form part of this specification.

My invention relates to an improvement in safety-guards for emery-wheels and grindstones; and it consists in placing a suitable guard between the emery-wheel or grindstone and the operator, so that in case the wheel or stone bursts there will be no danger of either the operator or any other persons in the building being injured.

It further consists in securing to the inner side of the guard, which is provided with suitable perforations for the operator to see through, a perforated plate, which will be forced against the guard in case the stone or wheel bursts, and thus close the aperture through which the workman is looking, so as to prevent any of the flying pieces from passing through the holes through which the operator was looking, and thus prevent any of the small pieces from striking the operator in the face.

The object of my invention is to place a safety-guard around a rapidly-revolving emery-wheel or grindstone, which, while it does not in any way interfere with the operator while at work, does prevent him from being injured in case the centrifugal force of the stone should cause it to burst, as frequently happens.

Figures 1 and 3 represent side elevations of my invention, showing different forms of frame, and Fig. 2 is a vertical section taken through Fig. 1.

A represents a common grindstone or emery-wheel, which is made to revolve in the usual manner. Around this wheel or stone I place a circular or curved metallic guard, B, either of the form shown in Figs. 1 and 3 or any other that may be preferred. Where the guard is made circular, as shown in Fig. 1, it will be suspended from the ceiling by the brace-rods D, which are provided with the swivels E for tightening the frame rigidly in place. Any other suitable tightening device may be used in place of the swivel for this purpose. Similar brace-rods, G, though much shorter, and also provided with swivels H, are attached to the guard at its bottom, for the purpose of holding the guard rigidly in place at this point, and in any desired fixed relation with the wheel or stone.

Where it is not desired to have the guard wholly circular, it may be made circular at the top only, and provided with the feet I, which are braced together by the cross-bar O, and by means of which the guard can be secured rigidly to the floor. Suitable brace-rods, L, extending at suitable angles, will also be used to brace the top of the guard in place, and each one of the rods may be provided with swivels or other devices, if so desired, so as to hold the guard always in position. Where it is not desirable to wholly surround the wheel or stone, a vertical guard of any greater height than the workman may be used upon one side of the wheel or stone only, and behind this guard the workman will stand while at work. This guard, whatever its shape may be, will be preferably made somewhat wider than the wheel or stone, so that in case the wheel or stone should burst there will be no danger of the operator or other persons in the building being injured by the flying fragments.

I do not place any limit to the width of the guard, because it may be as wide as the operator can conveniently get his arms around and work comfortably.

Through the guard, at any suitable point, will be made perforations for the workman to see through, and these openings, of any suitable shape and size, will be made at different heights above the floor, so as to accommodate workmen of different heights.

Secured to the inner side of the guard is a curved perforated plate, P, having its perforations in a line with the perforations in the guard, so that the workman, in watching his work, will look through the perforations in both the guard and the plate at the same time. This plate is made curved, so that should the stone burst, and any of the fragments strike against the plate, it will be instantly forced outward against the inner side of the guard, and thus close the openings, so that none of the small pieces can pass through them and strike the operator in the face. If this plate is made out of any spring material, it will be rigidly secured to the frame at its lower end; but in case it is not made of elastic material it will be loosely secured at its lower end, so that it can move freely back and forth against the guard.

Should the stone or wheel burst from the centrifugal force, as frequently happens, the fragments fly off in a straight line from the center, and these fragments will strike against the surrounding frame, and prevent not only the operator who may be working at the wheel or stone from being injured, but others who may be in the same room or building, as well as protect the building itself from injury.

If so desired, a cushion or pad may be secured to the outer side of the frame or casing for the workman to bear against with his chest.

Having thus described my invention, I claim—

1. A circular guard, B, surrounding an emery-wheel or grindstone, in combination with the brace-rods D G, provided with suitable adjusting devices, whereby the frame is supported in position, substantially as shown.

2. The combination of an emery-wheel or grindstone with a circular casing or frame for the protection of the workmen, and suitable brace-rods for securing the frame in place, substantially as set forth.

3. The combination of a perforated guard for an emery-wheel or grindstone with a perforated guard-plate that is secured to the inner side of the guard, and which serves to close the perforations in the guard in case the stone or wheel should burst, substantially as described.

4. The combination of an emery-wheel or grindstone with the casing B, provided with peep-holes for the workman to see through, substantially as specified.

5. The combination of an abrading-wheel with a guard surrounding and opposing the working portion of its periphery and open at its sides for the introduction of work from both sides between it and the wheel, as set forth.

In testimony whereof I affix my signature in presence of two witnesses.

CHARLES HEATON.

Witnesses:
P. M. WACKERHAGEN,
J. R. MELICK.